W. A. SMITH.
THREAD HANDLING MACHINE.
APPLICATION FILED MAY 8, 1916.
1,387,624.
Patented Aug. 16, 1921.
13 SHEETS—SHEET 6.
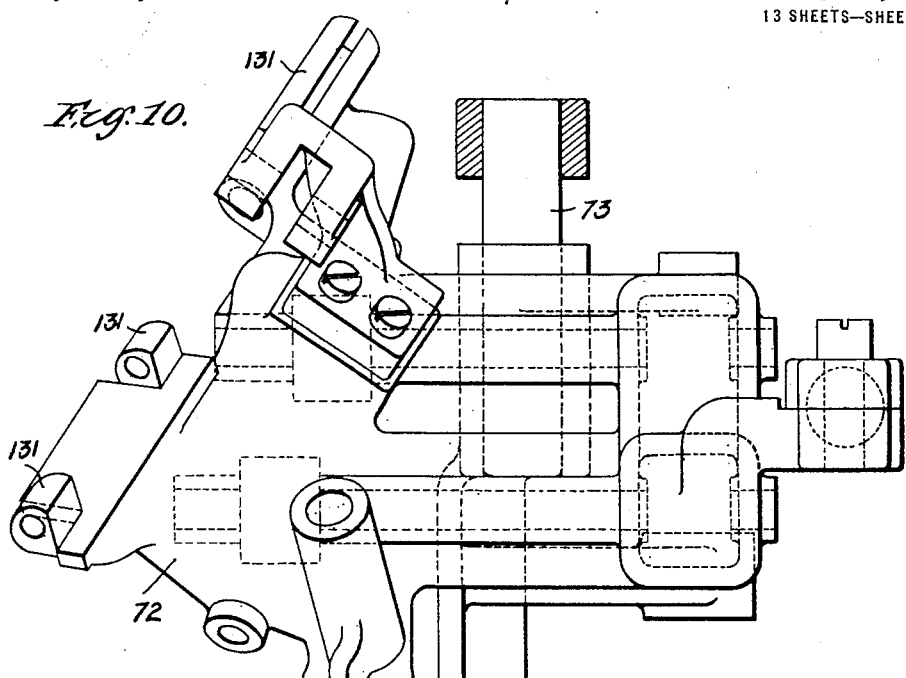
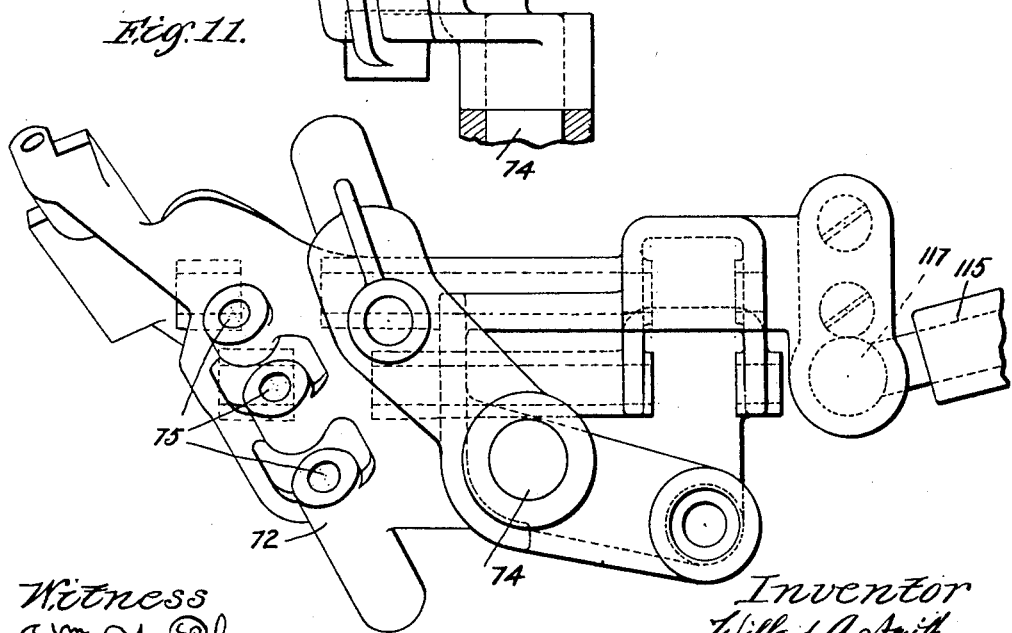

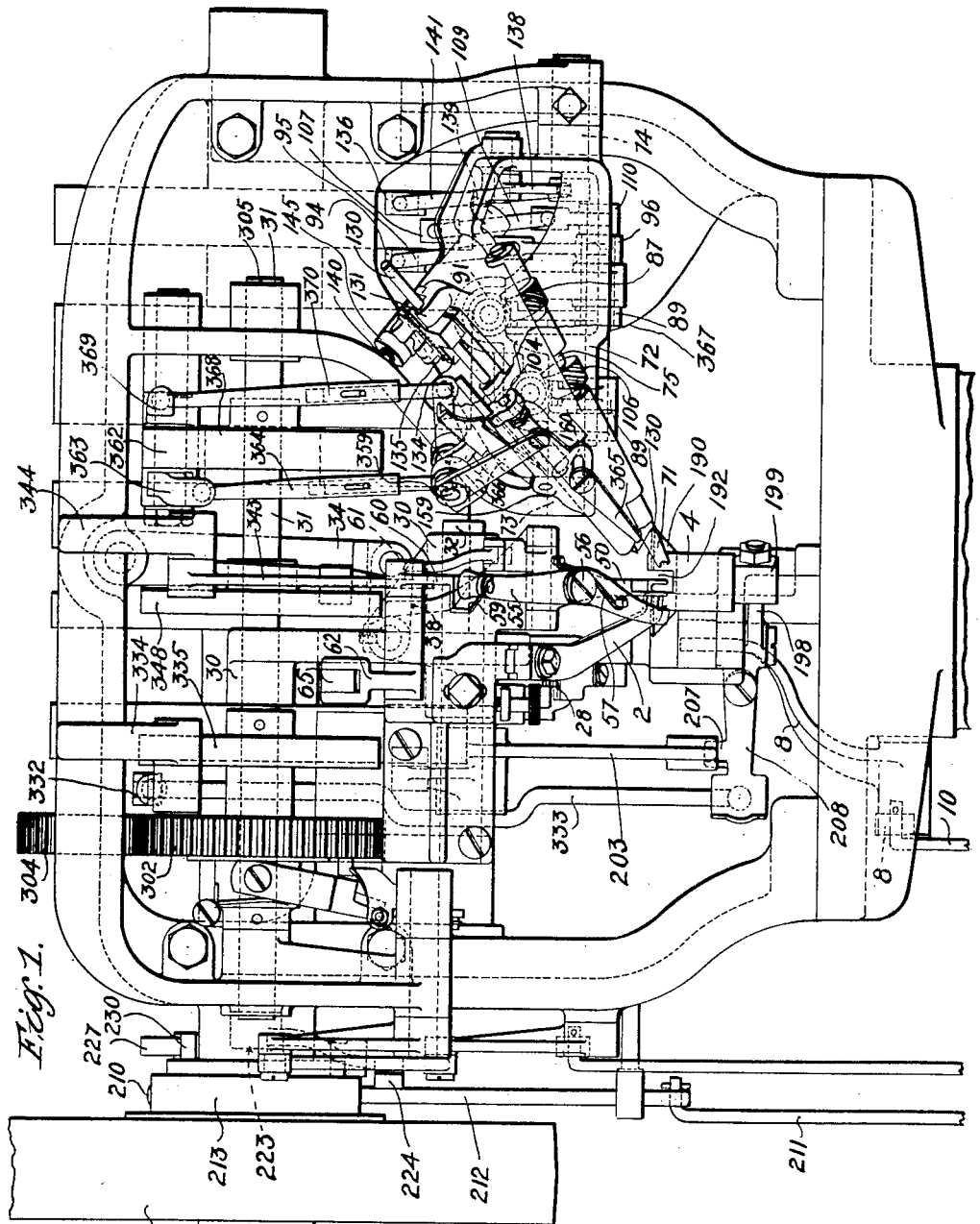

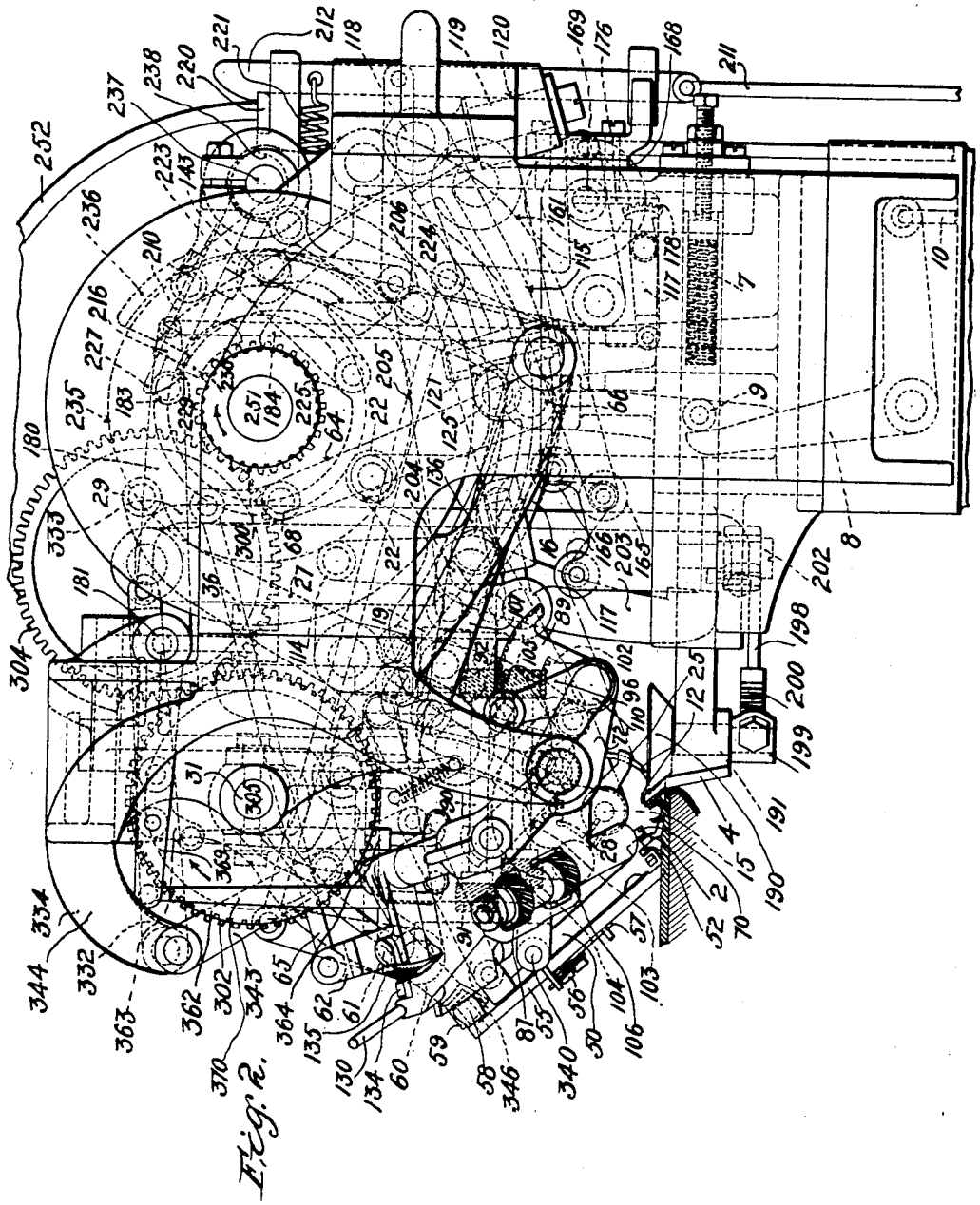

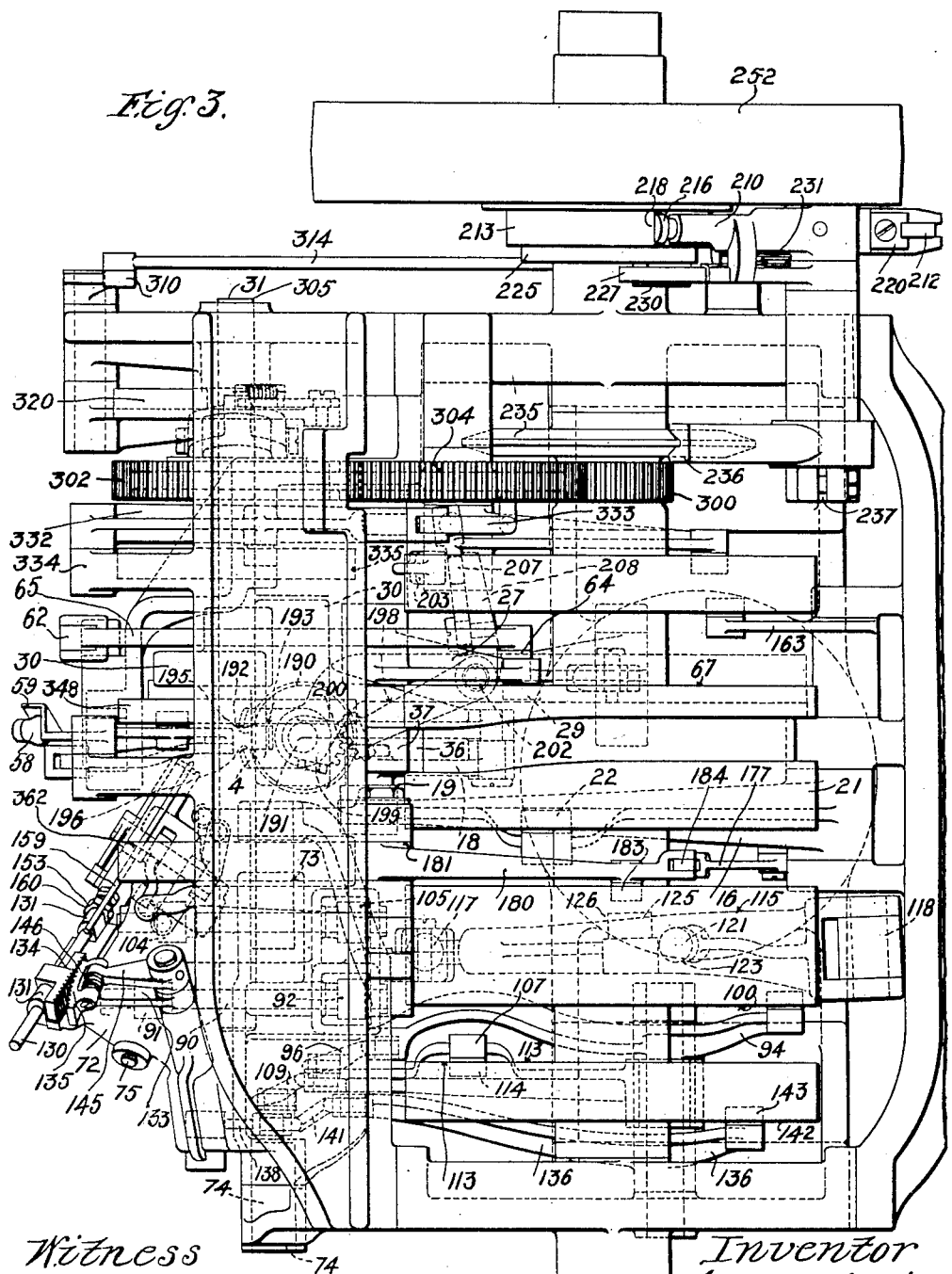

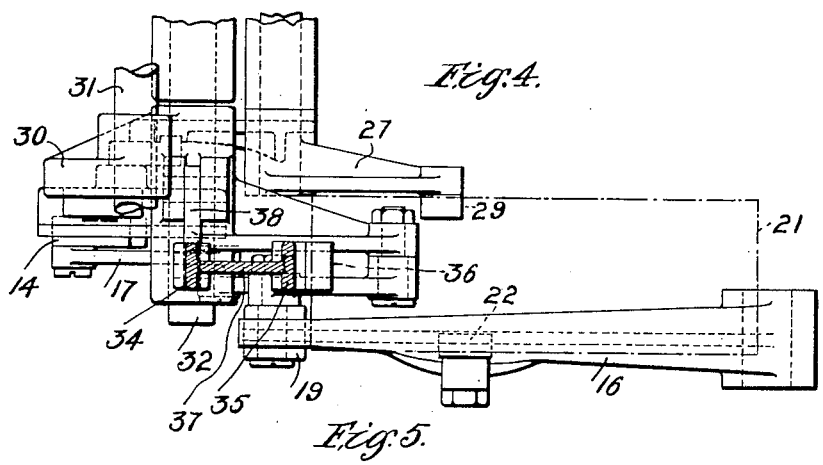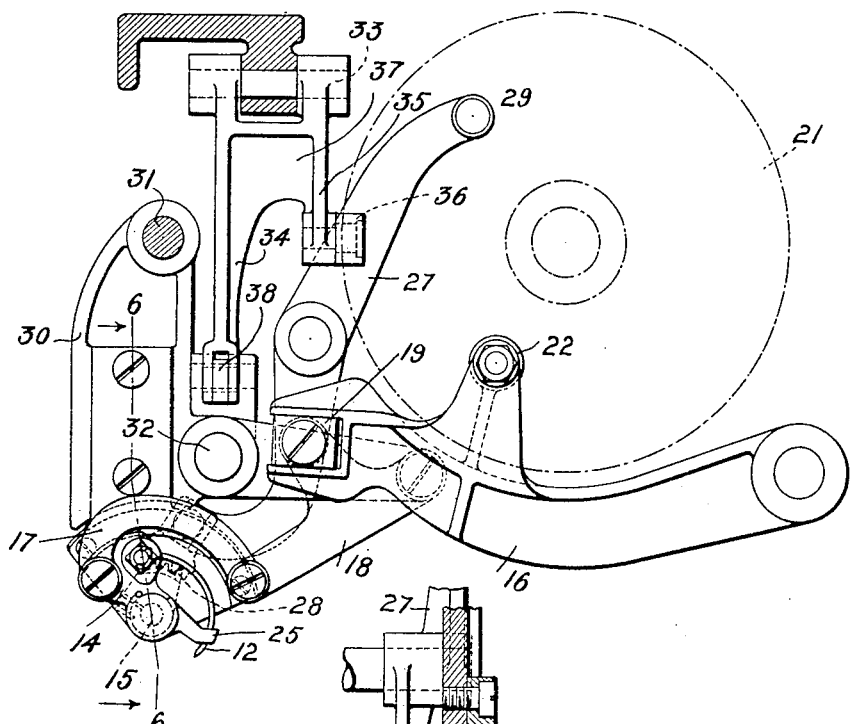

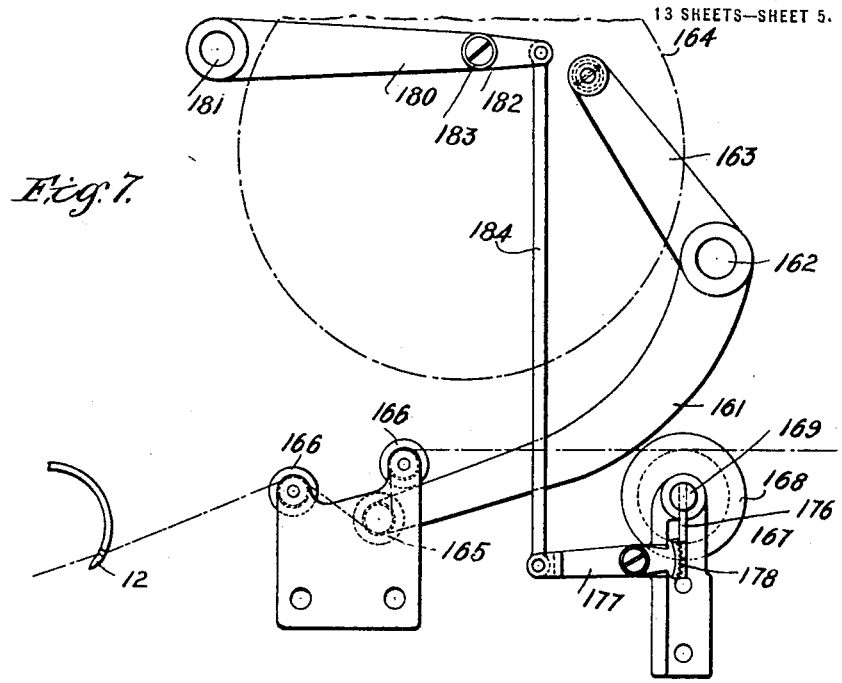
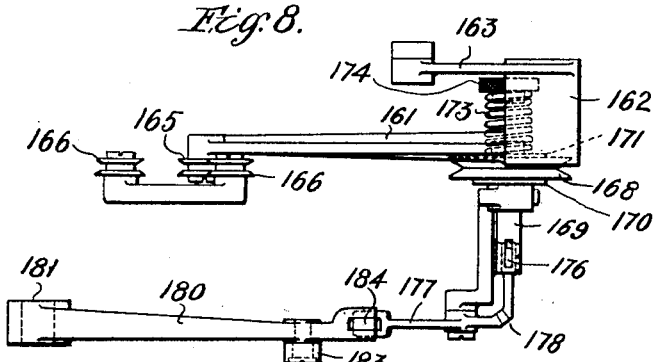
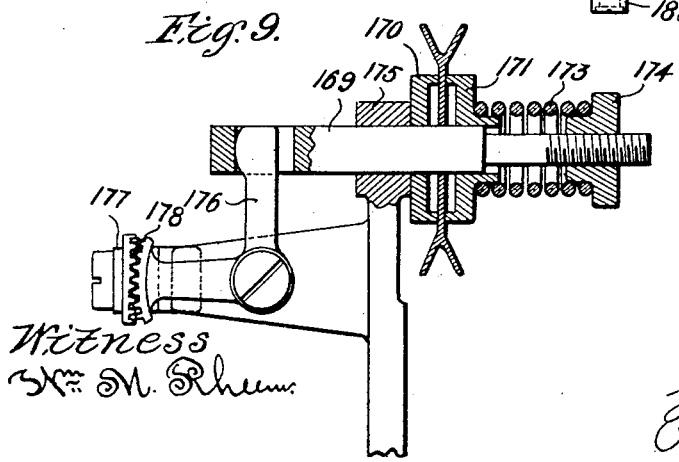

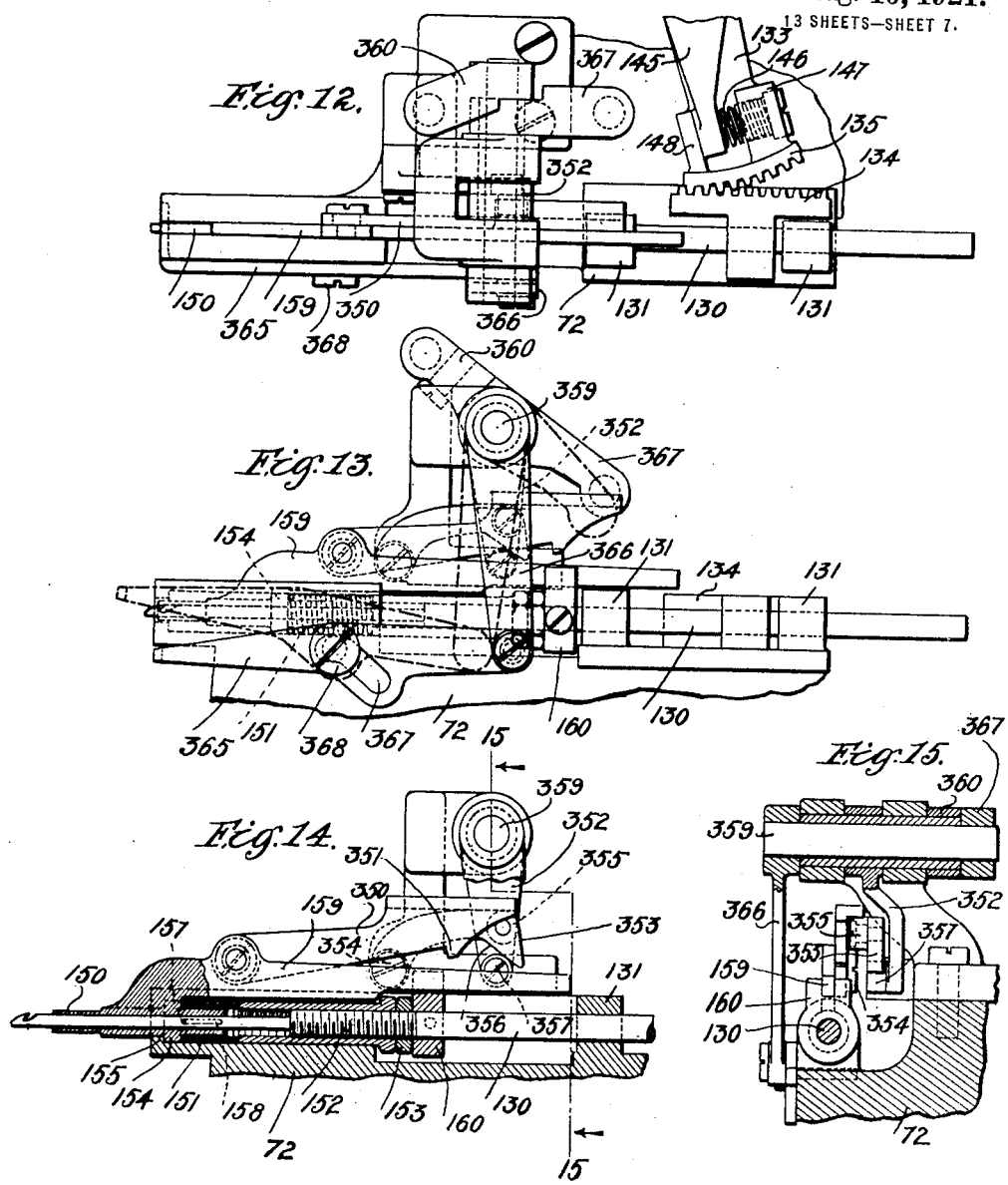

W. A. SMITH.
THREAD HANDLING MACHINE.
APPLICATION FILED MAY 8, 1916.
1,387,624.
Patented Aug. 16, 1921.
13 SHEETS—SHEET 8.
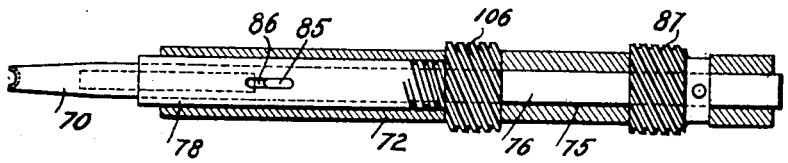
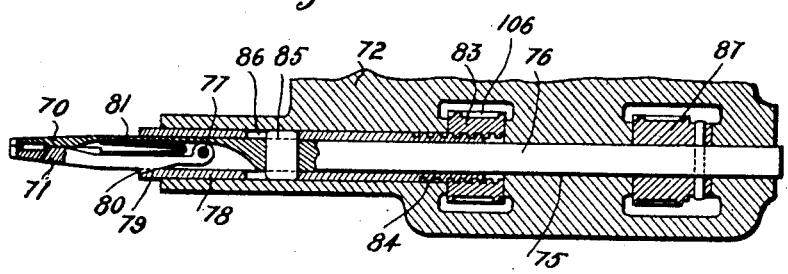
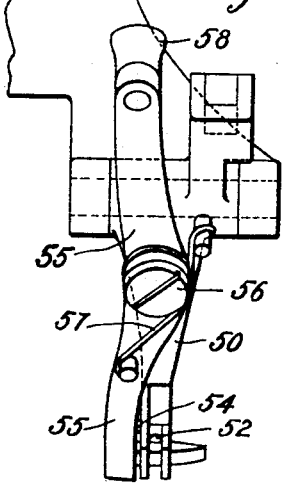
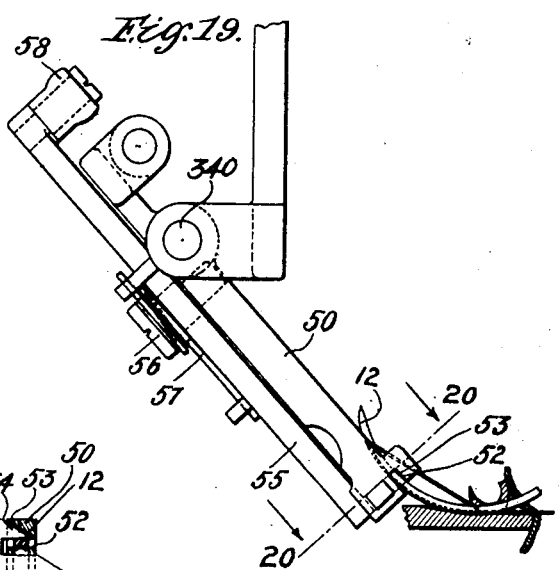
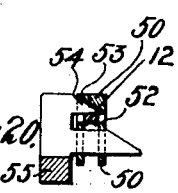
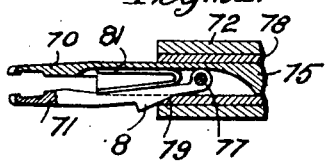
Witness
Wm. M. Rheem
Inventor
Willard A. Smith
by his attorneys
Phillips, Van Everen & Fish

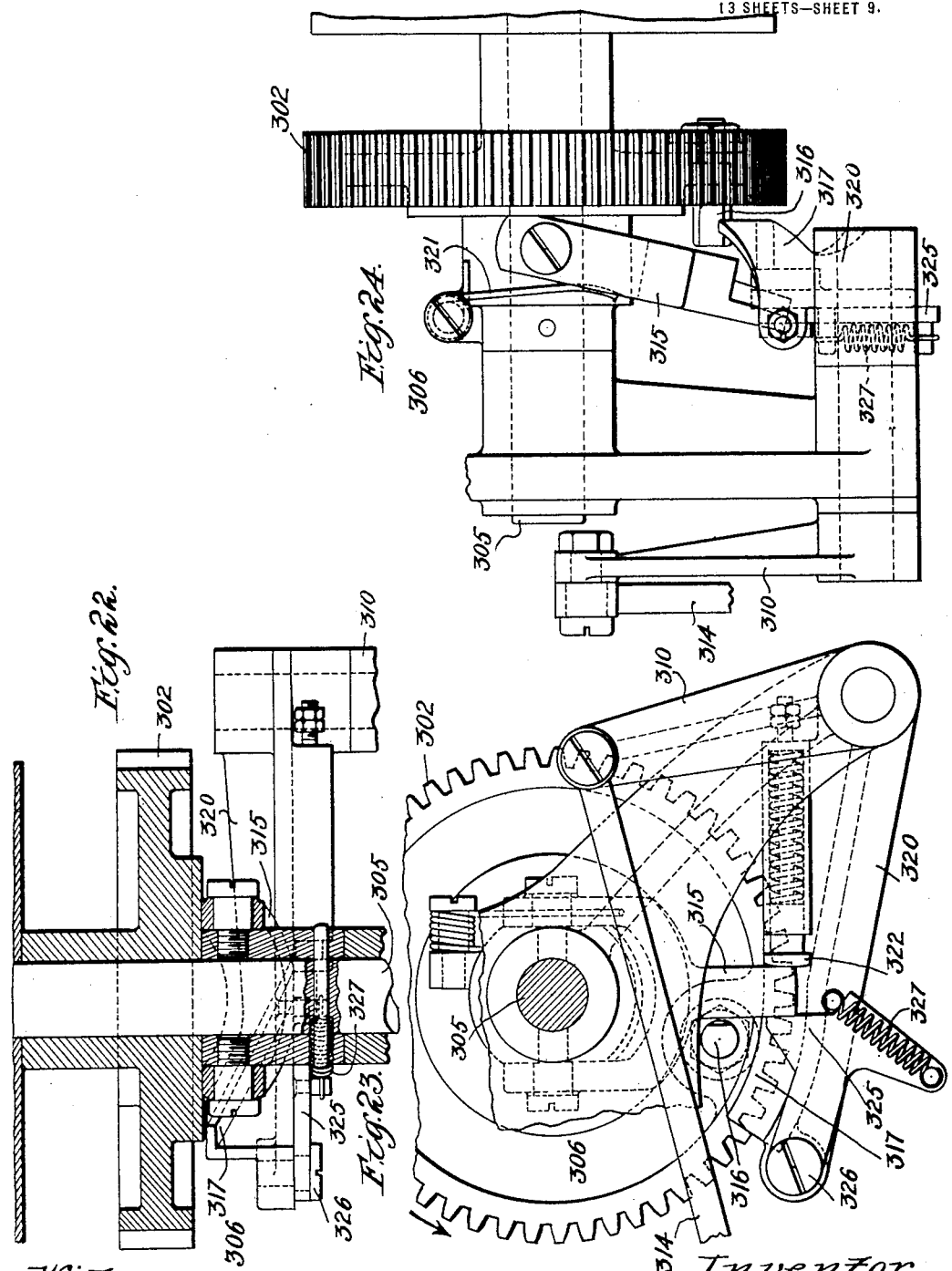

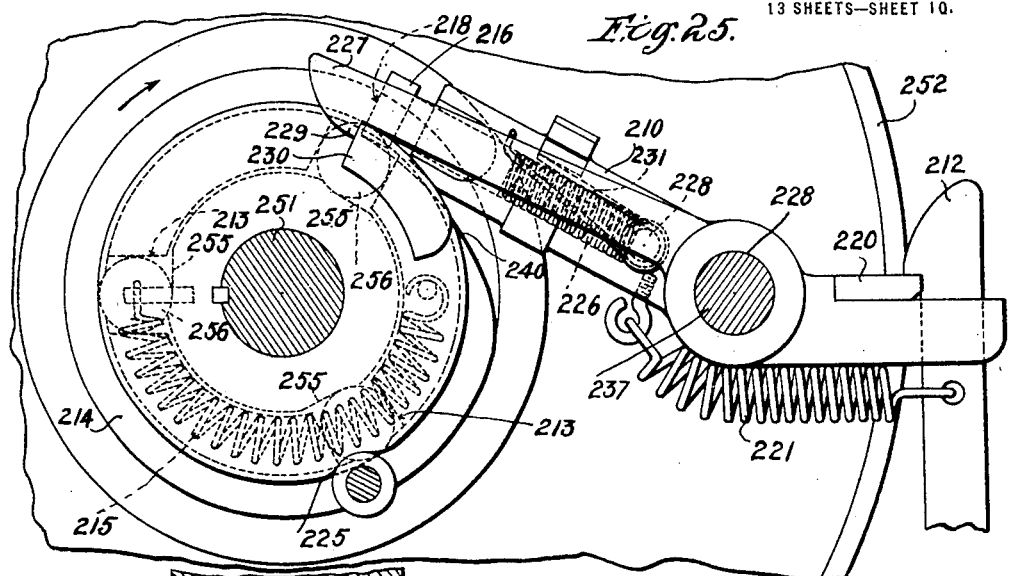
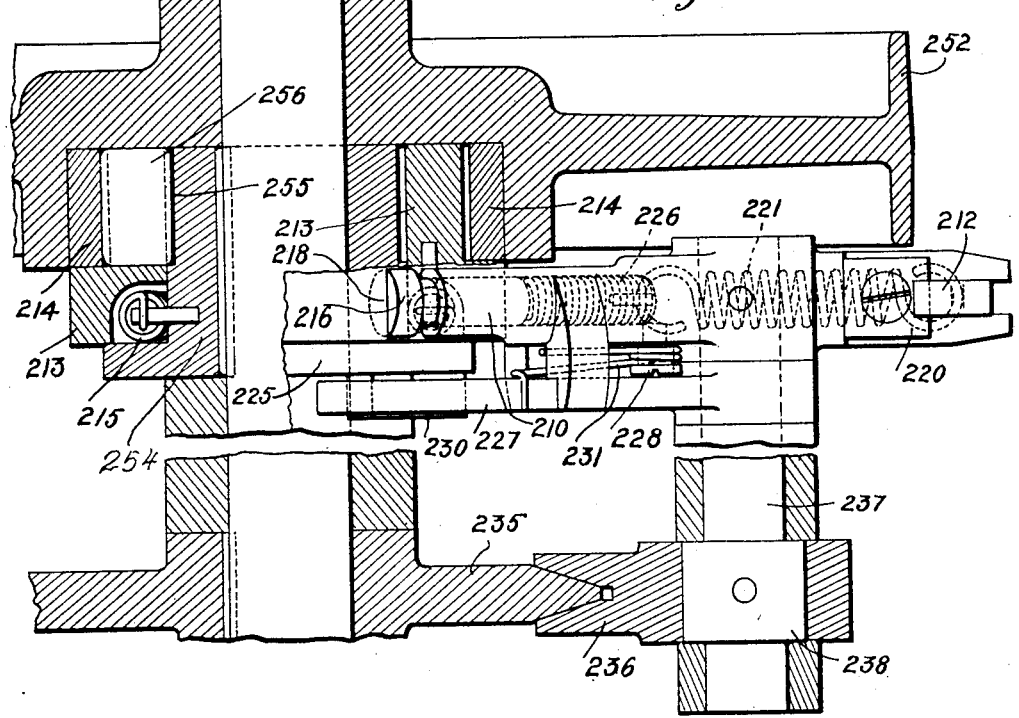

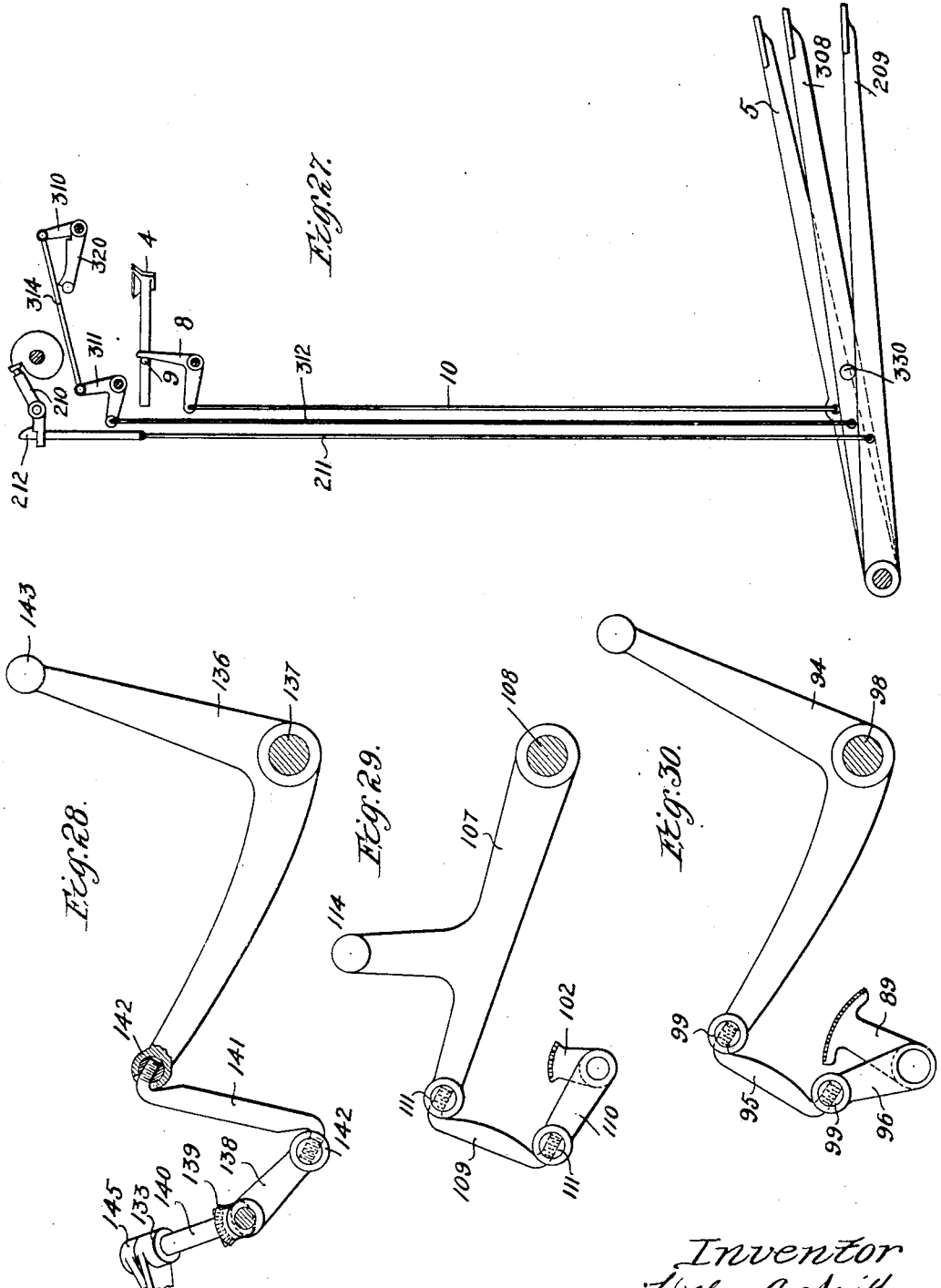

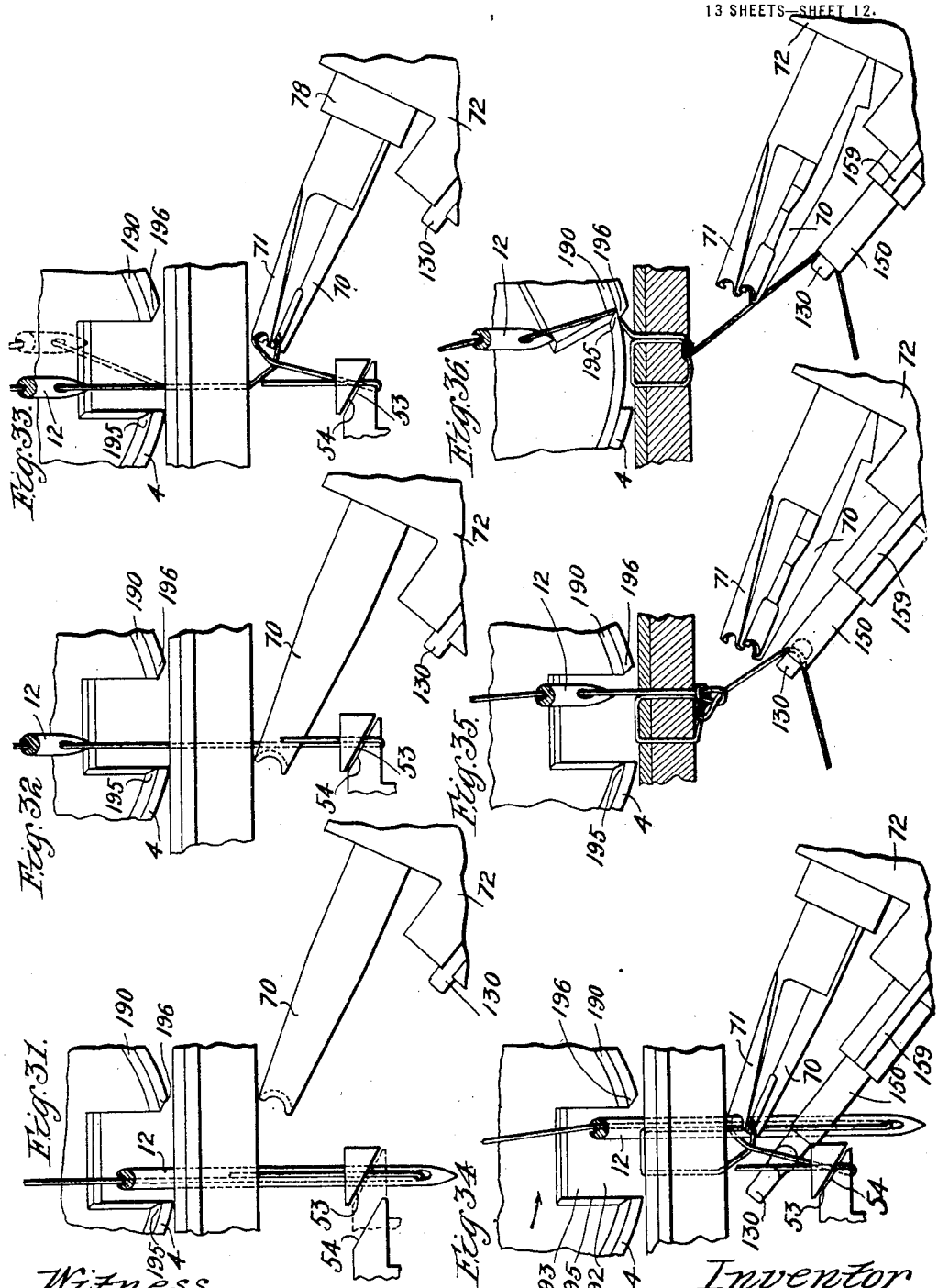

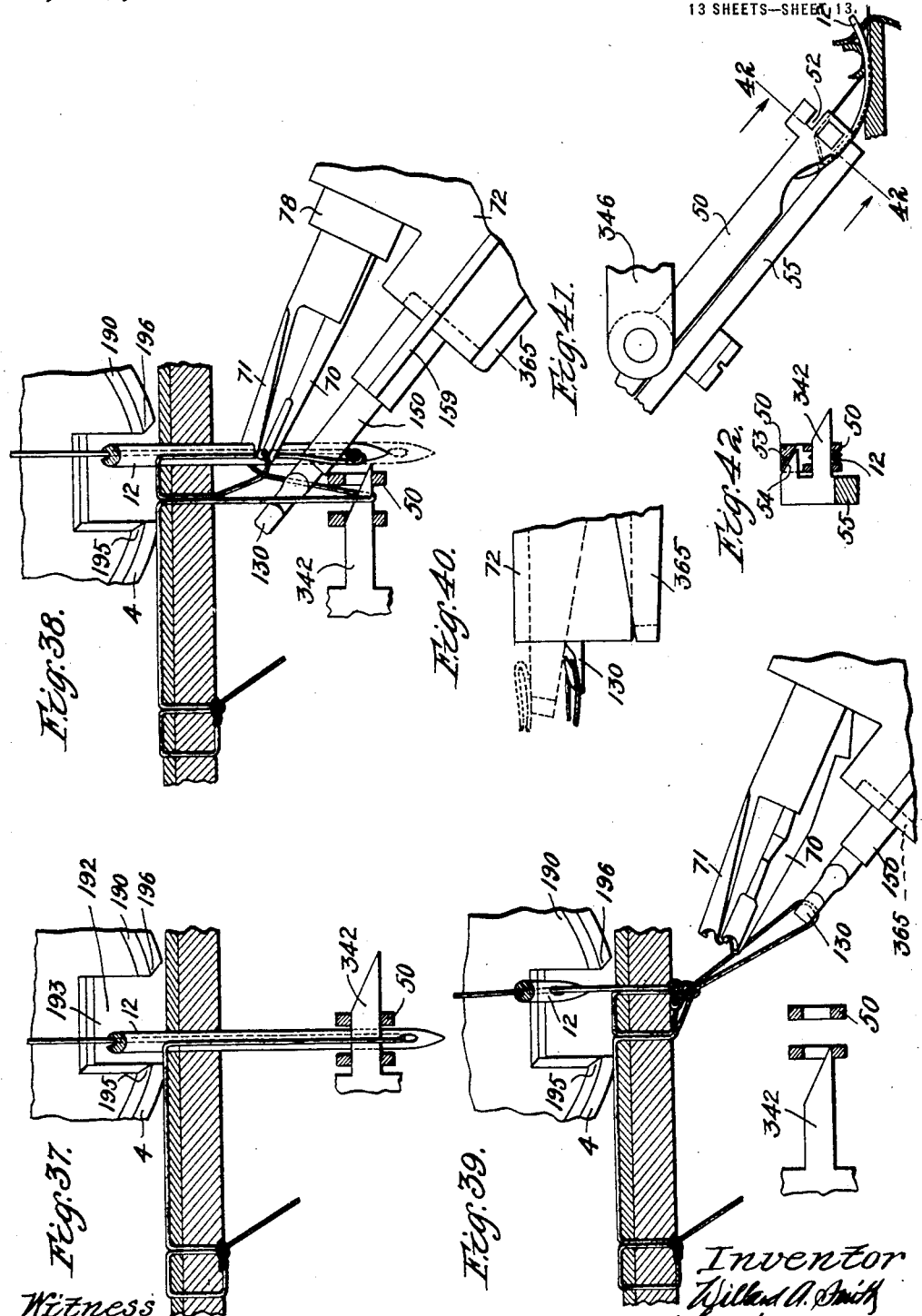

UNITED STATES PATENT OFFICE.

WILLARD A. SMITH, OF MELROSE, MASSACHUSETTS, ASSIGNOR, BY MESNE ASSIGN-MENTS, TO UNITED SHOE MACHINERY CORPORATION, OF PATERSON, NEW JERSEY, A CORPORATION OF NEW JERSEY.

THREAD-HANDLING MACHINE.

1,387,624.          Specification of Letters Patent.      Patented Aug. 16, 1921.

Application filed May 8, 1916. Serial No. 96,126.

*To all whom it may concern:*

Be it known that I, WILLARD A. SMITH, a citizen of the United States, residing at Melrose, in the county of Middlesex and State of Massachusetts, have invented certain new and useful Improvements in Thread-Handling Machines; and I do hereby declare the following to be a full, clear, and exact description of the invention, such as will enable others skilled in the art to which it appertains to make and use the same.

The present invention relates to thread handling machines and more particularly to machines of this type for inserting thread fastenings through the upper and insole lip of a lasted shoe.

One object of the present invention is to provide an improved type of thread handling machine which forms and inserts a thread fastener through the upper and insole lip of a lasted shoe and which is securely locked upon its completion to maintain the upper in its lasted position with relation to the lip of the insole.

A further object of the invention is to provide improved mechanism for knotting the adjacent ends of two threads together.

Still further objects of the invention relate to certain improvements by which separate and independent thread fastenings may be inserted about the sides of a lasted shoe and the toe portion of the lasted shoe secured by the thread which is retained at its opposite ends by thread fasteners.

With the above objects in view the several features of the invention consist in certain novel features of construction, combinations and arrangements of parts hereinafter described and claimed, the advantages of which will be obvious to those skilled in the art from the following description.

In the accompanying drawings illustrating the preferred form of the invention; Figure 1 represents a front elevation of a machine embodying the several features of the invention; Fig. 2 is a side elevation of the machine shown in Fig. 1; Fig. 3 is a top plan view of the machine shown in Fig. 1; Fig. 4 is a detail illustrating a plan view partly in section of the mechanism for actuating the needle; Fig. 5 is a side elevation partly in section of the needle actuating mechanism; Fig. 6 is a cross section taken upon the line 6—6 of Fig. 5 illustrating the mounting for the needle and needle guide; Fig. 7 is a detail showing a side elevation of the take-up and tension device; Fig. 8 is a top plan view of the mechanism shown in Fig. 7; Fig. 9 is an elevation partly in section of the thread tension device; Fig. 10 is a detail showing a plan view of the supporting head for the looper and hook; Fig. 11 is a side elevation of the supporting head shown in Fig. 10; Fig. 12 is a detail showing a plan view of a portion of the actuating mechanism for the hook; Fig. 13 is a side elevation of the mechanism shown in Fig. 12; Fig. 14 is a detail partly in section illustrating a different position of the hook actuating mechanism; Fig. 15 is a cross section upon the line 15—15 of Fig. 14; Fig. 16 is a detail partly in section of the looper; Fig. 17 is a view similar to Fig. 16 illustrating another view of the looper; Fig. 18 is a detail showing an elevation of the thread gripping members; Fig. 19 is an elevation of the thread gripping members illustrating the position of the members with operative relation to the needle; Fig. 20 is a cross section upon the line 20—20 of Fig. 19; Fig. 21 is a detail showing the looper fingers in a different position from that shown in Fig. 17; Fig. 22 is a detail illustrating a plan view partly in section of a portion of the clutch mechanism; Fig. 23 is a side elevation of the clutch shown in Fig. 22; Fig. 24 is a front elevation of the clutch shown in Fig. 22; Fig. 25 is a side elevation of the one revolution clutch controlling the operation of the machine as a whole; Fig. 26 is a cross section of the clutch shown in Fig. 25; Fig. 27 is a detail illustrating the relation of the various treadles and connections for operating the machine; Figs. 28, 29 and 30 are details illustrating the operative connections for the hook and looper members; Figs. 31 to 36, inclusive, are views partially diagrammatic illustrating the formation and insertion of a thread fastening and the severing of the thread at the completion of the fastening; Figs. 37, 38 and 39 are views partially diagrammatic, illustrating the formation and insertion of thread fastenings at the opposite ends of the toe thread in the operation of threading the toe; Fig. 40 is a view partially diagrammatic illustrating the operation of the cast-off for removing the loop of thread from the hook when passing about the toe; Fig. 41 is a detail illustrating the position of the thread gripper with relation to the needle when passing about the toe of the shoe; and Fig. 42 is a cross section upon the line 42—42 of Fig. 41.

The machine shown in the illustrated embodiment of the invention forms and inserts a thread fastening through the upper and insole lip of a lasted shoe and secures the adjacent ends of the thread together by what is commonly known as a weaver's knot. In the formation of this fastening a loop of thread is first passed through the work by a curved needle and one side of the loop is then gripped securely, after which the needle is retracted and fed into position for the formation of the next succeeding loop while the work is clamped in position. In the meantime, a substantial portion of the thread is engaged between the gripping fingers and the work by a looper member which imparts a half twist to the thread and draws the loop thus formed into a position in which the loop encircles the needle upon the next advancing movement. The needle is then advanced, passing the second loop of thread through the loop formed by the looping member and upon the completion of the advancing movement a hook is passed through the second loop below the encircling loop. The hook member is actuated to engage the thread between the gripping fingers and the encircling loop and to grip the bight of thread prior to the release of the thread by the gripping fingers. After the thread has been gripped securely by the hook the latter is withdrawn through the second loop carrying the thread with it to form the knot illustrated in Fig. 35. While the thread is held by the hook the supply thread is acted upon by a take-up member to tighten the knot and draw the fastening in close proximity to the work, as shown clearly in Fig. 36, after which the supply thread is severed at the opposite side of the work, leaving a sufficient length of thread to start the next succeeding fastening. With this type of thread fastening the upper and insole lip are securely locked together, and owing to the fact that the adjacent ends of the thread forming the fastening are knotted fast with one another there is no liability of the thread fastening becoming loosened to permit the lasted upper to slack off.

The work is held in position during the formation of the thread fastening by coöperating work supports which engage with opposite sides of the upper and insole lip of the lasted shoe. As shown clearly in Fig. 2 of the drawings, a stationary channel guide 2 is secured to the frame of the machine and projects into the channel of the shoe, and a back gage 4 is arranged to engage with the shoe opposite the channel guide. In order to permit the insertion and removal of the shoe the back gage is movable toward and from the channel guide and this movement of the back gage is conveniently controlled by the operator through a treadle 5, shown in Fig. 27 of the drawings. The back gage is slidingly supported in the machine frame and is normally moved toward the channel guide by a spring 7 and is retracted by a bell crank 8 operatively connected with the treadle 5 through a link 10 and engaging with a stud 9 secured to the back gage slide.

The mechanism for passing the loops of thread through the work comprises a curved eye needle 12 secured in a needle segment 14 fulcrumed at 15 and connected with an actuating lever 16 through an arm 18 and link 17 connecting the free end of the arm and the needle segment and operatively connected with the actuating lever 16 through a block 19 sliding in ways formed in the actuating lever, as shown clearly in Fig. 5. The actuating lever is operatively connected with a path cam 21 through the usual cam roll 22. The path cam is arranged to impart two reciprocating movements to the needle for each rotation of the cam shaft and is preferably designed in addition to form an upstanding bight of thread after the second loop has been passed through the work. This is conveniently accomplished by causing the needle to advance a slight distance after the second loop has been formed and during the retracting movement of the needle and maintain this advanced position for a sufficient length of time to permit the hook to pass through the bight of thread thus formed. The needle is preferably provided with a positively actuated needle guide 25 which is fulcrumed at 15 and is connected to an actuating lever 27 through the intermeshing gear segments 28. The needle guide actuating lever is operatively connected at its opposite end with a path cam 29 of suitable design. Between the formation of the two loops of thread the needle is moved bodily in a lateral direction to space the loops from one another, and to this end the needle is supported upon a head 30 slidingly mounted upon parallel guide rods 31 and 32. The head 30 is actuated by an oscillatory member 37 fulcrumed upon the machine frame at 33 and having an arm 34 connected with the head 30 through a link 38, and a second arm 35 operatively connected with a peripheral path cam 36.

Owing to the provision of the slide block 19 supported in the lever 16 and an elongated face formed upon one of the gear segments 28 the connections for actuating the needle and needle guide are enabled to compensate for the lateral movements of the head 30.

After the first loop of thread has been passed through the work by the curved needle it is firmly clamped between a pair of coöperating gripping jaws which engage with the thread above the needle, securely holding the thread during the retracting movement of the needle. A gripping jaw 50 is provided with a lateral slot 52 through which the needle passes, as indicated in Fig. 19 and with an inclined clamping face 53 which coöperates with a corresponding face 54 formed upon a gripping jaw 55 which is pivoted to the jaw 50 at 56. As shown clearly in Figs. 19 and 20 of the drawings the gripping jaw 55 is provided with a pointed end arranged to enter between the upper side of the needle and the thread, clamping the thread between the inclined faces 53 and 54. The jaws are normally closed by a spring 57 surrounding the pivot stud 56 and acting upon the movable jaw 55, and are positively opened against the action of the spring at predetermined intervals. In order to accomplish the opening movements of the jaws the opposite end of the gripping member 55 is provided with a roll 58 which operatively engages with an inclined cam face 59 formed upon the end of an arm 60 fulcrumed upon a shaft 61. A second arm 62 is secured to the shaft and is connected with the free end of a gripper actuating lever 64 through a link 65. The actuating lever 64 is fulcrumed upon the machine frame at 66 and is operatively connected with a path cam 67 through a cam roll 68. According to the operation of the present mechanism after the gripping jaws engage the thread, they remain in a closed position until the thread has been engaged and gripped by the hook member, after which the jaws are opened to release the thread.

After the thread has been clamped by the gripping members and the needle retracted it is engaged between the gripping members and the work by a looping device which engages a substantial portion of the thread and imparts a partial twist thereto, forming a loop of thread in position to encircle the needle upon the next advancing movement. The looping device not only forms a loop in the thread between the gripping members and the work, and positions this loop in the path of the needle, but also performs the function of a loop spreader in order to retain the loop thus formed in an open position to insure the passage of the needle therethrough. The looping device conveniently comprises a pair of coöperating jaws 70 and 71, respectively, which are supported in a head 72 slidingly mounted in oppositely disposed bearings 73 and 74 in order to permit the head to both reciprocate and oscillate as desired. The looping jaws are supported in an inclined position in bearings 75 formed in the head and are rotated to form a loop and moved toward and from one another to engage with and release the thread at predetermined intervals. To this end the looping jaw 70 is provided with a stem 76 formed integral therewith and supported in the bearings 75 and the jaw 71 is fulcrumed in a slotted portion of the jaw 70 at 77. The jaws are moved toward one another to clamp the thread between them by a sleeve 78 supported in the bearing 75 surrounding the stem 76 and having an inclined face 79 which engages with a corresponding cam face 80 formed upon the jaw 71 to cause an oscillatory movement of the jaw 71 upon moving the sleeve longitudinally. The jaws are opened after the sleeve has been withdrawn by a spring 81 interposed between the jaws, as shown clearly in Fig. 17. The longitudinal movements of the actuating sleeve 78 are imparted by an internally threaded nut 83 which engages with a corresponding thread 84 formed upon the sleeve 78. The nut is retained against longitudinal movement in the bearing 75 and the sleeve 78 is splined to the stem 76 by a pin 85 secured in the stem and engaging with a longitudinal slot 86 formed in the sleeve. The rotation of the looping jaws after they have been closed to clamp the thread between them is imparted by a spiral gear 87 secured to the stem 76, as shown clearly in Fig. 17. The looping jaws are rotated at the proper time by mechanism comprising an oscillatory gear segment 89 which is connected with the gear 87 through a transverse shaft 90 and spiral gears 91 and 92. The gear segment 89 is supported upon the head 72 and is operatively connected with a bell crank lever 94 through a link 95 and arm 96 secured to the gear segment 89. The bell crank 94 is fulcrumed upon the frame at 98 and in order to permit longitudinal movements of the head 72 relative to the bell crank lever 94 the opposite ends of the link 95 are connected respectively with the bell crank and arm 96 through universal joints indicated at 99. With this construction the longitudinal movements of the head carrying the gear segment 89 cause the ends of the link 95 to swivel slightly in the bearings without breaking or straining the operative connections. The bell crank lever 94 is operatively connected with a path cam 100 which is designed to rotate the looper jaws sufficiently to form a loop through which the needle passes in its second advancing movement. The opening and closing movements are imparted to the jaws by a gear segment 102 fulcrumed upon the head and connected with the nut 83 through a transverse shaft 103 having spiral gears 105 and 104 which mesh respectively with the gear segment and with spiral gear teeth 106 formed upon the periphery of the nut 83. The gear segment 102 is actuated by an arm 107 fulcrumed upon the frame at 108 and connected with the segment through a link 109 and an arm 110 secured to the segment. The link 109 is connected at its opposite ends to the arms 107 and 110 through universal joints indicated at 111. The arm 107 is operatively connected with a path cam 113 through a cam roll 114. With this construction a rotation of the nut 83 causes a longitudinal movement of the actuating sleeve 78 to open and close the jaws and during the opening and closing movements of the jaws the stem 76 and sleeve 78 are locked against rotation by the gear 87. After the jaws have been closed to clamp the thread the jaws and sleeve 78 are rotated bodily by the gear 87 to loop the thread for the passage of the needle. In order to spread the loop thus formed the looping jaws are provided with coöperating faces which are relatively wide and with curved flanges which coöperate with one another to spread the loop in the manner shown in Figs. 33 and 34 of the drawings. In order to move the looping jaws into position to engage with the thread and retract the looping jaws to position the loop of thread formed by the jaws in the path of the needle during the formation of the second loop, the head 72 is reciprocated in the bearings 73 and 74 carrying the looping jaws therewith. This reciprocatory movement is imparted automatically to the head at predetermined intervals by an actuating lever 115 connected at its front end to the head 72 through a universal joint indicated at 117. The opposite end of the actuating lever is pivoted at 118 upon the upper end of a pin 119 swiveled in a bearing, as shown clearly in Fig. 2 of the drawings. The actuating lever is provided with a cam roll 121 which operatively engages with a peripheral path cam 123 to oscillate the actuating lever in the swiveled bearing 120 reciprocating the head 72. In addition, a further movement is imparted to the looping jaws by oscillating the head 72 in the bearings 73 and 74. This oscillatory movement of the head is also imparted by the actuating lever 115 which is provided with a second cam roll 125 held in engagement with a peripheral cam 126 by a spring (not shown). This cam serves to oscillate the actuating lever about the pivotal connection 118 and the universal connection 117 between the actuating lever and head permits the lever to impart both oscillatory and longitudinal movements to the head 72.

After the needle has advanced the second time to pass a loop of thread through the loop held by the looping jaws the thread is engaged between the gripping jaws and the looping jaws by a hook which grips the thread and draws it through the second loop below the encircling loop. The hook is first advanced between the upper side of the needle and the thread, as shown clearly in Fig. 34, into position to engage properly with the thread after which the hook and a coöperating clamping member are relatively actuated to grip the thread and withdraw the thread through the second loop. In the meantime and after the hook has clamped the thread the gripping jaws are opened to release the thread and permit its withdrawal through the loop by the hook. In the illustrated embodiment of the invention the thread is clamped in the hook by a sliding sleeve which coöperates with the hook to grip the thread and also serves as a guard to protect the barb of the hook when the hook is withdrawn through the second loop of thread. The hook member is indicated at 130 and is slidingly supported in bearings 131 formed in the head 72. The shank of the hook member is connected at its rear end to an actuating arm 133 through a rack 134 secured to the hook and a coöperating gear segment 135, as shown clearly in Fig. 12. The arm 133 is supported upon the head 72 and is actuated from a bell crank 136 fulcrumed upon the frame at 137 and connected to the arm through a rocker arm 138, intermeshing gears 139 and a rock shaft 140. The bell crank 136 is connected to the rocker arm 138 through a link 141 connected to the rocker arm and bell crank at its opposite ends through universal joints indicated at 142 in order to permit relative movements of the bell crank and head. The bell crank 136 is operatively connected with a path cam through a cam roll 143. In order to provide a yielding movement of the hook after the thread has been gripped thereby the arm 133 is supported loosely upon the shaft 140 and a second arm 145 is secured to the shaft and has its lower end connected with the arm 133 through a spring 146 interposed between the arm 145 and an abutment 147 formed upon the arm 133. With this construction it will be noted that when the arm 145 is oscillated in a direction to withdraw the hook the movement of the arm is imparted to the arm 133 through the spring 146. When the arm 145 is moved in a direction to advance the hook the lower end of the arm engages with an abutment 148 formed upon the arm 133 serving to cause a positive advancing movement of the hook into position to engage with the thread. The thread is clamped in the hook and the barb of the hook is protected during the retracting movement through the second loop of thread by a sleeve 150 slidingly supported in bearings formed in the head 72, as shown clearly in Fig. 14 of the drawings. The sleeve 150 is connected with the hook through a compression spring 151 and a second sleeve 152 is threaded upon the hook and secured in position by a lock nut 153. When the hook is advanced by the actuating mechanism the sleeve 150 through the spring 151 and the second sleeve 152 normally moves with the hook until a shoulder 154 formed upon the sleeve 150 engages with an upstanding flange 155 formed upon the head to limit the further movement of the sleeve in this direction. A continued movement of the hook in the same direction then compresses the spring 151, withdrawing the sleeve from the position shown in Fig. 13 to that shown in Fig. 14 and leaving the barb of the hook uncovered. As shown clearly in Fig. 34 of the drawings the hook is advanced between the upper side of the needle and the thread into a position beneath that portion of the thread which extends between the gripping jaws and the looping jaws. The hook is then retracted and engages with this portion of the thread, the spring 151 in the meantime expanding to relatively actuate the sleeve and hook, causing the sleeve to close upon the hook and clamp the thread. When the spring has expanded to its initial position to close the sleeve upon the barb of the hook a continued rearward movement of the hook causes a like movement of the sleeve 150 carrying the thread therewith through the second loop of thread. In order to prevent the sleeve 150 from moving beyond the barb of the hook under the action of the spring 151 a pin 157 is secured in the hook and engages with a longitudinal slot 158 formed in the hub of the sleeve, as shown clearly in Fig. 14. The sleeve 150 is guided in the head 72 and supported against rotation relative thereto by a guide member 159 formed upon the sleeve and received in the longitudinal slot formed in the head. The guide member in addition locks the sleeve against rotation relative to the hook by a slotted collar 160 through which the guide rod passes.

The retracting movement of the hook draws the thread through the second loop beneath the encircling loop, as shown clearly in Fig. 35, tightening the encircling loop about the second loop, after which the hook holds the thread during the action of the take-up. In order to set the knot and draw the knot closely against the work the supply thread is pulled upon to draw the second loop toward the work and bind the thread which passes therethrough against the encircling loop and the work. To this end the supply thread is engaged back of the needle by a take-up arm 161 fulcrumed upon the machine frame at 162 and having a second arm 163 secured thereto which is operatively connected at its end with a path cam 164. The take-up arm is provided with a roll 165 which engages with the thread between a pair of guide rollers 166 to pull on the thread and set the knot in a manner well known to those skilled in the art. The thread is put under tension during the formation of the fastening and is locked during the action of the take-up to set the knot by a tension device and thread lock indicated generally at 167. The tension device comprises a grooved roll 168 about which the thread passes supported loosely upon a shaft 169 and having oppositely disposed friction members 170 and 171 arranged to engage therewith. The friction member 170 is held in fixed position and the tension roll 168 is clamped against the friction member 170 by the member 171 to put either a tension on the thread or to lock the thread as desired. The member 171 is yieldingly connected with the shaft 169 through a compression spring 173 interposed between the member and a collar 174 threaded upon the shaft. The shaft 169 is slidably supported in bearings 175 and is actuated through a bell crank 176 connected to an actuating lever 177 through intermeshing gears 178. An operating arm 180 is fulcrumed upon the frame at 181 and is operatively connected with a path cam 182 through a cam roll 183. The free end of the operating arm is connected to the actuating lever through a link 184.

After the knot has been set by the take-up and drawn close to the work the supply thread is severed in close proximity to the work by a thread cutting device. The thread cutting mechanism is conveniently mounted upon the back gage and comprises a thread cutting knife to which a positive cutting stroke is imparted by a simple and compact actuating mechanism. A rotary thread cutter is indicated at 190 and is provided with a stem 191 journaled in the back gage, as shown clearly in Fig. 2. The needle thread normally passes through a slot 192 formed in the face of the back gage, as shown clearly in Figs. 31 to 35 of the drawings and the rotary knife is normally positioned, as shown clearly in these figures with a corresponding slot 193 registering with the slot in the back gage. After the needle has been withdrawn from the work a second time at the completion of the fastening the knife is rotated in the direction of the arrow, causing the cutting edge 195 to engage with the thread and shear it against a coöperating cutting edge 196 formed upon the face of the back gage, as shown clearly in Fig. 36 of the drawings. The cutting stroke is conveniently imparted to the knife 190 by a bell crank 198 which is connected with an arm 199 secured to the lower end of the stem 191 through intermeshing gears 200. The bell crank is fulcrumed upon the back gage slide at 202 and has its opposite arm arranged to operatively engage with an actuating arm 203 fulcrumed at 204 and having a second arm 205 secured thereto which is operatively connected with a path cam 206. The lower end of the arm 203 is arranged to contact with a lug 207 formed upon a latch 208 pivoted to the arm of the bell crank 198 when the back gage is in an advanced position to clamp the work. When the back gage is retracted at the completion of the thread fastening the bell crank 198 is moved therewith out of engagement with the operating arm 203.

After the shoe has been inserted in the machine and clamped between the channel guide and back gage the machine is started by mechanism under the control of the operator to form and insert the thread fastening and sever the thread at the completion of the fastening, after which the machine is automatically stopped. The various cams for imparting the proper movements to the thread fastener forming and inserting and thread severing devices are conveniently mounted upon a single cam shaft and designed to complete the cycle of operations necessary to form a thread fastening during one rotation of the cam shaft. The operation of the cam shaft is controlled by a clutch which causes the shaft to make one complete rotation and to then stop in the initial position, leaving the various parts of the machine in readiness for the formation of the next succeeding fastener. To this end a cam shaft 251 is journaled in bearings in the machine frame and is actuated by a continuously rotated drive pulley 252 adapted to be connected with the cam shaft through a single revolution clutch. The clutch is controlled by a starting treadle 209 connected with a pivoted latch 210 through a connecting rod 211 and hook 212, as shown clearly in Fig. 27 of the drawings. The clutch is of the well-known form comprising a plurality of clutch rollers, the position of which is controlled by suitable retaining cages to cause the rollers to clutch the drive pulley to the cam shaft 251 at predetermined intervals. The shaft is provided with a collar 254 secured thereto and having a series of inclined clutch faces 255 which are engaged by clutch rollers 256. The position of the rollers is controlled in the usual manner by a cage 213 which is interposed between the collar 254 and a clutch ring 214. The cage is normally moved in a direction to cause the rollers to clutch the drive pulley to the shaft by a spring 215 connecting the collar with the retaining cage, as shown clearly in Fig. 25. The clutch is normally disengaged during the time that the machine is idle by the engagement of a stop pin 216 with a coöperating shoulder 218 formed upon the retaining cage 213, as shown clearly in Figs. 25 and 26. The stop pin 216 is supported upon the pivoted latch 210 and upon depressing the treadle the pin is elevated to permit the retaining cage to be moved by the spring 215 to clutch the drive pulley to the shaft 251. As soon as the shoulder 218 has passed under the stop pin 216 the pin is permitted to rest upon the periphery of the cage and the movement of the shaft is continued until one complete rotation has been made and the shoulder 218 has returned to its initial position in engagement with the pin, as shown in Fig. 25. The depression of the treadle serves simply to disengage the stop pin from the shoulder and the operative connection between the treadle and the pivoted latch 210 is then broken. To this end the hook 212 engages with an arm 220 secured to the rear end of the latch 210, as shown clearly in Fig. 25 and after the arm has been depressed sufficiently to release the stop pin the hook 212 slides over the arm 220 permitting the latch 210 to be returned to its initial position by a tension spring 221 connecting the latch with the upper portion of the connecting rod 211. Upon releasing the treadle the hook is elevated and returned by the spring 221 to its initial position. In order to prevent the engagement of the hook 212 with the pivoted latch during one complete rotation of the cam shaft a bell crank 223 is fulcrumed upon the frame and connected with the hook 212 through a link 224. As shown clearly in Figs. 2 and 25 of the drawings the bell crank is operatively connected with a peripheral cam 225 which retains the hook portion of the connecting rod out of engagement with the latch 221 until a complete rotation of the cam shaft has been made. In order to prevent a sudden cessation of movement of the cam shaft the stop pin 216 is supported yieldingly in the pivoted latch by a spring 226 received in a bore formed in the latch behind the stop pin. The position of the cam shaft and connecting parts is determined exactly upon the rebound by a latch member 227 pivoted to the latch 210 at 228 and having a hook 229 which is arranged to engage behind a laterally projecting lug 230 formed upon the collar 254. The latch 227 is provided with a curved face which permits the movement of the projection in the direction of the arrow and is normally moved into the position shown in Fig. 25 by a spring 231. With this construction the cam shaft makes one complete rotation, is brought yieldingly to rest, and is then returned to exactly the same position each time, leaving the various parts of the machine in readiness to start the next succeeding thread fastening.

In order to aid in the stopping of the cam shaft the clutch is provided with a brake mechanism which comprises a friction disk 235 secured to the cam shaft and adapted to be engaged by a correspondingly shaped shoe 236 supported upon a shaft 237 carrying the pivoted latch. The friction shoe is actuated upon a partial rotation of the shaft 237 through an eccentric bushing 238, as shown clearly in Figs. 2 and 26 of the drawings. With this construction the pivoted latch is normally retained in position to remove the brake shoe from engagement with the friction disk during the major portion of rotation of the cam shaft, and when the stop pin reaches the portion of the periphery indicated generally at 240 the latch pin is oscillated to oscillate the shaft 237 and cause a more or less gradual application of the brake shoe 236.

With the above described construction it will be noted that the control of the machine during the insertion of the fastenings about the sides of the shoe is secured by the manipulation of two treadles. Upon depressing one treadle the operator separates the back gage and channel guide to permit the convenient insertion of the shoe after which the treadle is released and the shoe clamped in position. Upon depressing the second treadle the operation of the cam shaft is started and this shaft makes one complete rotation to form and insert a thread fastening and sever the thread, after which the machine is stopped with the parts in their initial position.

It is desirable to employ the thread for fastening in the toe portion of the lasted shoe and with this end in view thread fasteners are conveniently inserted at opposite sides of the toe and are connected by a thread passing about the toe. This is accomplished by inserting a thread fastener at one side of the toe, manipulating the shoe to pass a thread from the fastener about the toe, and while the toe thread is held taut, inserting a second fastener at the opposite side of the toe. The present machine is provided with mechanism under the control of the operator for modifying the operation of the thread fastener forming and inserting mechanism when threading the toe of the shoe. The control mechanism when actuated throws an auxiliary mechanism into operation during the formation of the two thread fasteners upon opposite sides of the toe. This auxiliary mechanism renders the thread severing mechanism inoperative to prevent the cutting of the thread at the completion of the first thread fastener and modifies the operation of the thread grippers and thread hook during the formation of the second thread fastener. The auxiliary mechanism is actuated from the main shaft of the machine through a driving pinion 300 secured to the main shaft and operatively connected with a driven gear 302 through an idler 304. The gear 302 is supported upon a cam shaft 305 and is operatively connected therewith at predetermined intervals through a one revolution clutch indicated generally at 306. The ratio of the gearing connecting the two shafts is such that the cam shaft 305 makes a single revolution for each two revolutions of the main shaft, thus the cam shaft and auxiliary mechanism actuated thereby completes one cycle of operations for two cycles of operation of the stitch forming mechanism actuated by the main shaft. The clutch 306 is controlled by a treadle 308, as shown clearly in Fig. 27, connected with a clutch operating arm 310 through an intermediate bell crank 311 and connecting rods 312 and 314 respectively. The gear 302 is loosely supported upon the shaft 305 and is connected therewith at intervals through an arm 315 pivotally secured to the shaft and operatively engaged by a stud 316 projecting laterally from the gear. The arm 315 is normally retained out of engagement with the stud by engagement with a cam member 317, as shown clearly in Fig. 24. The cam member is supported upon the free end of an arm 320 secured to the clutch operating arm 310 and upon depressing the treadle the arm 320 is moved downwardly a sufficient distance to permit the inward movement of the pivoted arm 315 under the action of a spring 321. The operative connection between the gear and shaft continues for one complete rotation of the shaft, after which the lower end of the arm 315 engages with the cam member 317, moving the arm out of engagement with the stud 316. The rotation of the shaft is stopped gradually by a buffer pin 322 mounted yieldingly in the arm 320. The shaft is positioned accurately when at rest by a latch 325 pivoted upon the end of the arm at 326 and arranged to normally engage behind the arm 315 through the action of a spring 327, as shown clearly in Fig. 23. It will be noted from an inspection of Fig. 27 of the drawings that the treadle 308 is normally retained above the treadle 209 and is provided with a stud 330 which is arranged to engage with the treadle 209 upon depression of the treadle 308, thus causing the actuation of both the shaft 305 and the shaft 251 upon the depression of the single treadle. It will be noted from an inspection of Figs. 37 to 39, inclusive, of the drawings, which illustrate diagrammatically the operation of forming two connected thread fasteners, that upon the completion of the first thread fastener the shoe is fed into position for the insertion of the second thread fastener without severing the thread. To this end the auxiliary mechanism is arranged to render the thread severing mechanism inoperative at the completion of the first of the two thread fasteners inserted at the toe. From an inspection of Fig. 1 of the drawings it will be noted that the thread cutting mechanism is provided with a pivoted latch 208 having an upstanding lug 207 which is engaged at predetermined intervals by an oscillatory arm 203. The thread cutting mechanism is rendered inoperative by removing the lug 207 from engagement with the arm 203 and to this end the free end of the pivoted latch is connected with an actuating lever 332 through a connecting rod 333, as shown clearly in Figs. 1 and 2 of the drawings. The actuating lever is pivoted at one end upon an overhanging arm 334 and is operatively connected intermediate its ends with a path cam 335. It will be noted that the path cam makes one complete rotation during the formation of two thread fasteners and that the cam is arranged to render the cutting mechanism inoperative at the completion of the first thread fastener only, the thread being severed in the usual manner at the completion of the second thread fastener. The action of the gripping jaws in engaging and positioning the first loop of thread is modified somewhat during the formation and insertion of the second thread fastener. To this end the gripping jaw 50 is pivoted upon the machine frame at 340, as shown clearly in Figs. 2 and 19 of the drawings. The gripping jaws are oscillated about the pivotal connection 340 to cause the needle to pass through the jaw 50 in the manner shown in Figs. 41 and 42. With the needle in this position when the jaws are closed a thread finger 342 formed upon the jaw 55 passes between the thread and needle, spreading the loop sufficiently to permit the entrance of one of the looping fingers between the two sides of the loop. The oscillatory movement of the gripping members is accomplished by an actuating arm 343 pivoted at its upper end upon an overhanging arm 344 and pivotally connected to the upper end of the gripping member 50 through a link 346. The actuating arm is operatively connected between its ends with a path cam 348 mounted upon the cam shaft 305. After the loop has been engaged and spread as described and the needle retracted the looping members advance in the usual manner to engage with the side of the loop, as shown clearly in Fig. 38. The second loop is formed by the needle and passed through the encircling loop held by the looper and the hook is then advanced through the second loop to engage with one side of the first loop, as shown clearly in Fig. 38. In forming the second thread fastening it will be noted that one side of the first loop of thread passes about the toe and when this loop is engaged by the hook member it is desirable that both sides of the loop shall be pulled upon to maintain the toe thread taut. To this end the loop of thread is not clamped in the hook but is permitted to freely reeve through the hook, thus causing the loop to be centered upon the hook when the hook is withdrawn, tightening the toe thread securely. In order to insure the engagement of the hook with the loop and the retention of the loop during the withdrawal of the hook through the second loop the hook member, as shown clearly in Fig. 38, is advanced inside of the loop into position to engage with the upper thread of the loop and draw the loop out in the manner shown in Fig. 39. In order to cause the hook to enter inside of the loop the gripper actuating mechanism is arranged to shift the gripper members back to the initial position prior to the movement of the hook into engagement with the loop. In connection with the operation of the hook, mechanism is provided for maintaining the clamping sleeve in an inoperative position during the retracting movement of the hook to permit the loop to lie loosely in the barb of the hook. To this end, as shown clearly in Figs. 12 to 14, inclusive, a latch 350 is pivoted upon the clamping sleeve 150 and is provided with a shoulder 351 which engages behind the collar 160 after the hook has been advanced. The latch is normally maintained in an elevated position, as shown in Fig. 14, by an actuating arm 352 which is operatively connected with the latch through an arm 353 pivoted upon the sleeve at 354 and having a stud 355 which engages beneath an inclined face formed upon the latch. The intermediate arm 353 is provided with an inclined face 356 which is engaged by a stud 357 formed upon the arm 352. The actuating arm 352 is supported upon a shaft 359 and has a second arm 360 connected thereto which is actuated from a path cam 362 through a lever 363 and a telescoping connecting rod 364. With this construction, when the hook has been advanced to engage with the loop of thread and the clamping sleeve is separated from the barb of the hook, as shown in Fig. 14, the arm 352 is oscillated to permit the latch 350 to drop behind the collar, locking the clamping sleeve in an inoperative position during the retracting movement of the hook. It will be noted that a sufficient space is formed between the bight of thread and the curved needle to permit the withdrawal of the hook carrying the first loop through the second loop without liability of the barb of the hook catching upon the side of the loop. It will be noted that in forming the second thread fastening when threading the toe the hook 130 is engaged with a closed loop which it is desirable to cast off the hook. To this end a cast-off 365 is supported upon the head 72 adjacent the hook and is operatively connected with an arm 366 supported upon the shaft 359. The cast-off is provided with a cam slot 367 which receives a stud 368 secured to the head 72 and upon oscillating the arm 366 the cast-off is moved upwardly and across the end of the hook in the manner indicated in Fig. 13 to remove the loop of thread held thereby. The arm 366 is connected to a second arm 367 which is actuated from a path cam 368 through an arm 369 and a telescoping connecting rod 370. It will be noted that the mechanism for modifying the operation of the thread cutting devices, the thread gripping members, the thread hook, and for actuating the cast-off is all mounted and actuated from the cam shaft 305 which is controlled by the treadle 308 during the operation of threading the toe. The various cams for modifying the operation of these mechanisms are designed to complete one cycle of operations during two rotations of the main cam shaft or during the formation of two thread fasteners. The auxiliary mechanism renders the thread cutting devices inoperative at the completion of the first thread fastener, but modifies the movements of the thread gripper members and thread hook during the formation and insertion of the second thread fastener.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:—

1. A thread handling machine, having, in combination, work positioning members, a needle, mechanism for actuating the needle to pass two spaced loops of threads through the work, means for gripping the first loop of thread, devices for engaging with one side of the first loop of the thread between the gripping member and the work and means for actuating said devices to twist the thread to form a closed loop therein, means for positioning the loop thus formed in the path of the needle to cause the second loop to be passed therethrough, and means for passing the first loop of thread through the second loop beyond the encircling loop.

2. A thread handling machine, comprising a thread gripping loop taker, a needle, means for actuating the needle to pass two loops of thread through the work, and means for actuating the loop taker to first advance and engage one side of a loop of thread and to then form a closed loop in the thread thus engaged and position the loop thus formed in the path of the needle.

3. A machine for inserting thread fastenings through the upper and insole lip of a lasted shoe, having, in combination, work positioning devices, thread fastener forming and inserting devices and thread cutting devices coöperating during each cycle of operations of the machine to form and insert a thread fastener and sever the thread, and auxiliary mechanism under the control of the operator for rendering the thread cutting mechanism inoperative and for modifying the operation of the thread fastener forming and inserting devices.

4. A machine for inserting thread fastenings through the upper and insole lip of a lasted shoe, having, in combination, work positioning devices, thread fastener forming and inserting devices, thread cutting mechanism, and auxiliary mechanism under the control of the operator acting automatically to render the thread cutting mechanism inoperative at the completion of a thread fastening and to modify the operation of the thread fastener forming and inserting devices during the formation of the next succeeding thread fastening.

5. A thread handling machine, comprising work positioning devices, a needle, mechanism for actuating the needle to pass a loop of thread through the work, a gripping jaw provided with a lateral slot through which the needle passes and an inclined clamping face, a second gripping jaw having a correspondingly inclined face and a pointed end arranged to enter between the upper side of the needle and the thread, and mechanism for relatively actuating the jaws to clamp the thread.

6. A thread handling machine, comprising work positioning devices, a needle, mechanism for actuating the needle to pass a loop of thread through the work, a pair of coöperating looping jaws, mechanism for moving the jaws into operative relation to one side of the loop of thread, means for closing the jaws upon the thread, and means for rotating the jaws to form a loop.

7. A thread handling machine, comprising work positioning devices, a needle, mechanism for actuating the needle to pass a loop of thread through the work, a head, a pair of looping jaws supported upon the head, means for closing the jaws upon the thread, means for rotating the jaws to form a closed loop of thread, and means for actuating the head to position the jaws in operative relation to one side of the loop of thread and to position the loop of thread formed by the jaws in the path of the needle.

8. A thread handling machine comprising a head, a looping jaw mounted in the head, a coöperating jaw pivoted upon the first mentioned jaw, a sleeve surrounding and arranged to act upon the jaws, and mechanism for relatively moving the jaws and sleeve in a lengthwise direction to open and close the jaws.

9. A thread handling machine, comprising a head, a stem supported in the head, a looping jaw mounted upon the stem, a coöperating jaw pivoted thereto, a sleeve surrounding the stem, mechanism for relatively moving the stem and sleeve in a lengthwise direction to open and close the jaws, and mechanism for rotating the stem to cause the jaws to form a loop.

10. A thread handling machine, comprising a head, mechanism for reciprocating the head, a pair of coöperating looping jaws supported in an inclined position in the head, means for opening and closing the jaws to engage and clamp one side of a loop of thread, and means for rotating the jaws to form a loop.

11. A thread handling machine, comprising a needle, actuating mechanism for causing the needle to pass a loop of thread through the work, mechanism for gripping one side of the loop of thread, a hook, mechanism for actuating the hook to engage the thread between the gripping members and the work, and means for clamping the thread in the hook.

12. A thread handling machine, comprising gripper members, a hook for engaging with a thread held by the gripper members, means for clamping the thread in the hook when engaged thereby, and means for releasing the thread from the gripper members when clamped in the hook.

13. A thread handling machine, comprising a needle, mechanism for actuating the needle to pass a loop of thread through the work, gripper members for engaging the first loop of thread, a hook, mechanism for advancing the hook through the second loop of thread into engagement with the first loop of thread, means for clamping the thread in the hook, mechanism for causing the gripper members to release the thread, and mechanism for withdrawing the hook through the second loop of thread.

14. A thread handling machine, comprising a hook, a clamping sleeve movable relative to the hook, mechanism for advancing and retracting the hook, and means for actuating the sleeve to clamp the thread in the hook controlled by the retracting movement of the hook after the latter has engaged with the thread.

15. A thread handling machine, comprising a main cam shaft, stitch forming mechanism operated thereby and arranged to complete a cycle of operations during a single rotation of the cam shaft, an auxiliary cam shaft, mechanism operated thereby for modifying the action of the stitch forming mechanism, and driving connections between the two cam shafts for imparting a single rotation to the auxiliary cam shaft during each two rotations of the main cam shaft.

16. A thread handling machine, comprising a main cam shaft, stitch forming mechanism operated thereby and arranged to complete a cycle of operations during a single rotation of the cam shaft, an auxiliary cam shaft, mechanism operated thereby for modifying the action of the stitch forming mechanism, driving connections between the two cam shafts for imparting a single rotation to the auxiliary cam shaft during each two rotations of the main cam shaft, and manually operated means for controlling the operation of the auxiliary cam shaft and to cause the auxiliary mechanism to be thrown into operation when passing about the toe of a shoe.

17. A thread handling machine, comprising an auxiliary cam shaft, thread cutting mechanism, means for normally operating the thread cutting mechanism during each cycle of operations of the machine, and mechanism controlled by the auxiliary cam shaft for rendering the cutting mechanism inoperative during one cycle of operations of the machine and for permitting the operation of the thread cutting mechanism during the next succeeding cycle of operations.

18. A thread handling machine, comprising a thread cutting knife, mechanism for operating the knife including a pivoted latch and an oscillatory arm arranged to engage with the latch at predetermined intervals, and mechanism for removing the latch from the path of movement of the oscillatory arm.

19. A thread handling machine comprising a needle, mechanism for actuating the needle to pass a loop of thread through the work, thread gripping jaws, and mechanism for moving the thread gripping jaws prior to the advancing movement of the needle to vary during successive cycles of operation of the machine the position of the jaws with relation to the loop of thread formed by the needle.

20. A thread handling machine comprising a needle, mechanism for actuating the needle to pass a loop of thread through the work, a pivoted gripping jaw, a coöperating jaw connected thereto, and means for bodily oscillating both jaws prior to the advancing movement of the needle to vary during successive cycles of operation of the machine the position of the jaws with relation to the path of the needle.

21. A thread handling machine, comprising a needle, mechanism for actuating the needle to pass a loop of thread through the work, a thread hook, mechanism for actuating the hook to engage with one side of the loop of thread, means for normally clamping the thread when engaged by the hook, and mechanism for rendering the thread clamp inoperative.

22. A thread handling machine, comprising a needle, mechanism for actuating the needle to pass a loop of thread through the work, thread gripping jaws arranged to engage with the loop of thread, a thread hook, mechanism for actuating the thread hook to engage with the loop of thread, and a device for casting off the loop of thread from the hook at the completion of the cycle of operations.

23. A thread handling machine, comprising a needle, mechanism for actuating the needle to pass two loops of thread through the work, coöperating gripping jaws for engaging with the first loop, a thread hook, mechanism for actuating the thread hook to pass the hook through the second loop and engage with the first loop and to thereafter draw the first loop through the second, and means for casting off the first loop from the thread hook after it has been drawn through the second loop.

24. A thread handling machine, comprising a cam shaft, a driving pulley and a one-revolution clutch connected with the cam shaft and driving pulley, comprising a collar provided with a series of inclined clutch faces, a cage, a plurality of clutch rollers positioned by the cage, means for normally retaining the cage against movement, and mechanism under the control of the operator for releasing the cage to permit the clutch to be connected.

25. A thread handling machine having, in combination a coöperating back gage and channel guide, and thread fastener forming and inserting instrumentalities constructed and arranged to pass a thread through the upper and insole lip of a lasted shoe twice from the same side and to knot the ends of the thread together upon the opposite side of the work.

26. A thread handling machine comprising a pair of coöperating looper jaws, a sleeve surrounding the jaws, means for bodily moving the jaws and sleeve to advance and retract the jaws, and means for relatively moving the jaws and sleeve to open and close the jaws.

27. A thread handling machine comprising a pair of looper jaws, a head carrying both jaws, mechanism for actuating the head, a slide supported within the head, and means for moving the slide lengthwise of the jaws to open and close the latter.

28. A thread handling machine comprising a head, a looper jaw journaled within the head, a coöperating jaw pivoted upon the first mentioned jaw, a sleeve slidingly supported within the head and surrounding the two jaws, means for moving the sleeve in a lengthwise direction to open and close the jaws, and means for rotating the jaws within the head.

29. A thread handling machine comprising a head, a hook slidingly mounted in the head, mechanism for reciprocating the hook within the head, a clamping sleeve, yielding connections between the sleeve and hook, and means for stopping the advancing movement of the sleeve prior to the complete advancing movement of the hook to withdraw the sleeve from the barb of the hook.

30. A thread handling machine comprising a hook, a clamping sleeve, yielding connections between the sleeve and hook, means for positively limiting the advancing movement of the sleeve, and means for advancing and retracting the hook.

31. A thread handling machine comprising a head, a hook sliding in the head, means for advancing and retracting the hook, a sleeve surrounding the hook, yielding connections between the sleeve and hook to cause the sleeve to normally move with the hook, and means for positively limiting the advancing movement of the sleeve prior to the completion of the advancing movement of the hook.

32. A thread handling machine comprising a needle, a pair of gripping jaws, means for normally operating the jaws to clamp a thread passed through the work by the needle, and mechanism for modifying the movements of the jaws to cause them to enter the loop of thread passed through the work by the needle without clamping the thread.

33. A machine for inserting thread fastenings through the upper and insole lip of a lasted shoe having, in combination, work positioning devices and means for passing a single thread twice through the upper and insole lip of the shoe to form a loop and for interlocking the ends of the thread in a knot to close the loop and firmly secure the lip and upper.

34. A machine for inserting thread fastenings through the upper and insole lip of a lasted shoe having, in combination, work positioning devices, a curved eye pointed needle, means for actuating the needle to pass a thread through the upper and insole lip a plurality of times from one side of the work to form a loop, and means coöperating with the needle to interlock the ends of the thread in a weaver's knot to close the loop and firmly secure the lip and upper.

35. A machine for inserting thread fastening through the upper and insole lip of a lasted shoe having, in combination, work positioning devices, a curved eye pointed needle, mechanism for actuating the needle to pass a thread through the upper and insole lip twice from the same side, means for engaging the thread first passed through the work and forming a loop of the thread thus engaged in the path of the needle to cause the needle to be encircled upon the second advancing movement and means for drawing the free end of the thread through the loop formed upon the second advancing movement of the needle beyond the encircling loop.

36. A thread handling machine having, in combination, work positioning devices, an eye pointed needle, means for actuating the needle to pass a thread through the work, a gripper arranged to engage the thread passed through the work by the needle, a looper, and means for actuating the same to form a closed loop in the thread between the gripper and the work and position said loop in the path of the needle whereby said loop is caused to encircle the next loop of thread passed through the work by the needle, a hook and means for actuating the hook to pass the end of the thread held by the gripper through the last needle loop beyond the encircling loop.

37. A thread handling machine having, in combination, work positioning devices, thread handling devices, means for actuating said thread handling devices to fasten the free end of a thread in the work and means for thereafter actuating said thread handling devices to pass two loops of the thread through the work at a distance from said point and to interlock said loops to form a knot.

38. A thread handling machine having, in combination, work positioning devices, thread handling devices, means for actuating said thread handling devices to fasten the free end of a thread in the work and means for thereafter actuating said thread handling devices to pass two loops of the thread through the work at a distance from the point at which the free end is fastened, to form a third loop in one leg of the first loop and cause it to encircle the second loop, to draw the first loop through the second loop beyond the encircling loop and to continue the pull on the first loop to tighten the knot formed by interlocking the loops and to tighten the stretch of thread between the point at which the free end is fastened in the work and the first loop.

WILLARD A. SMITH.